United States Patent [19]

Camras

[11] 3,928,869

[45] Dec. 23, 1975

[54] VIDEO TRANSDUCING APPARATUS

[75] Inventor: Marvin Camras, Glencoe, Ill.

[73] Assignee: IIT Research Institute, Chicago, Ill.

[22] Filed: Sept. 20, 1971

[21] Appl. No.: 182,229

Related U.S. Application Data

[60] Division of Ser. No. 34,504, May 4, 1970, Pat. No. 3,705,954, which is a division of Ser. No. 649,256, June 27, 1967, Pat. No. 3,596,008, which is a continuation-in-part of Ser. No. 528,934, Feb. 21, 1966, abandoned.

[52] U.S. Cl. .......................... 360/55; 360/33; 358/4

[51] Int. Cl. .......................................... H04n 5/76

[58] Field of Search........ 178/6.6 A, 5.4 CD; 358/4; 360/55, 33

[56] References Cited

UNITED STATES PATENTS 3,320,370 5/1967 Barry .............................. 178/6.6 A

OTHER PUBLICATIONS

"Electronics Circuits & Tubes," Cruft Laboratory, Copyright 1947, McGraw-Hill, pp. 54–57.

*Primary Examiner*—Richard Murray
*Attorney, Agent, or Firm*—Hill, Gross, Simpson, Van Santen, Steadman, Chiara & Simpson

[57] ABSTRACT

Monochrome and color television recording and playback circuitry for coupling of a video magnetic transducer head with a standard broadcast television receiver, the circuitry including an inductor connected in series between the transducer head and the input of the playback amplifier and disposed closely adjacent the amplifier input for blocking transmission of stray radio frequency energy to the amplifier.

1 Claim, 1 Drawing Figure

VIDEO TRANSDUCING APPARATUS

CROSS REFERENCES TO RELATED APPLICATIONS

The present application is a division of my pending application Ser. No. 34,504 filed May 4, 1970 (now U.S. Pat. No. 3,705,954 issued Dec. 12, 1972). Said application Ser. No. 34,504 in turn is a division of my application Ser. No. 649,256 filed June 27, 1967 (now U.S. Pat. No. 3,596,008 issued July 27, 1971). Said application Ser. No. 649,256 is a continuation in part of my application U.S. Ser. No. 528,934 filed Feb. 21, 1966 (now abandoned in favor of Ser. No. 62,601 filed Aug. 10, 1970 and issued as U.S. Pat. No. 3,683,107 on Aug. 8, 1972). Said applications Ser. No. 528,934, Ser. No. 649,256 and Ser. No. 34,504 are referred to herein pursuant to the requirement of 35 U.S.C. 120.

BACKGROUND OF THE INVENTION

An important problem in the magnetic recording art relates to the need for a video transducer apparatus which can be manufactured at a reasonable cost and yet which will provide quality transducing of television signals, and particularly color television signals and the associated audio signals.

SUMMARY OF THE INVENTION

This invention relates to a wide band transducing system and method, and particularly to a system for recording and/or reproducing black and white and color television signals.

It is an object of the present invention to provide an economical television transducing system such as would be particularly suitable for home or educational uses.

Another object of the invention is to provide a wide band transducer system capable of effective transducing of signals with frequency components extending into the megacycle range at head scanning speeds of 120 inches per second or less.

A further object of the invention is to provide a system and method for effectively and economically transducing color television signals; and also to provide such a system which need have an upper frequency response limit of only two megacycles per second or even one megacycles per second.

A further object resides in the provision of a television recording and/or playback system with a high gain-low noise amplifier operable at relatively low tape speeds and with relatively narrow head widths.

Another object resides in a method and apparatus for high fidelity recording and/or reproduction at low cost.

A still further object is to provide a transducer system which is relatively insensitive to record speed variations.

Still another and further object of the invention resides in the provision of a relatively inexpensive and simple system for recording audio signals associated with a color video signal.

Other objects, features and advantages of the present invention will be apparent from the following detailed description taken in connection with the accompanying drawings.

IDENTIFICATION OF NON-ESSENTIAL MATERIAL INCORPORATED HEREIN FOR PURPOSES OF INDICATING THE BACKGROUND OF THE INVENTION

The disclosure of the present application set forth hereinafter is taken from the disclosure relating to the first figure of my U.S. Pat. No. 3,596,008 issued July 27, 1971, and reference is hereby made to the remaining portions of the disclosure physically present in said U.S. Pat. as comprising non-essential subject matter for purposes of indicating the background of the invention.

BRIEF DESCRIPTION OF THE DRAWINGS

The single FIGURE is an electric circuit diagram showing a television recording and playback system in accordance with the present invention.

DESCRIPTION OF THE ILLUSTRATED EMBODIMENT

Figure 1:
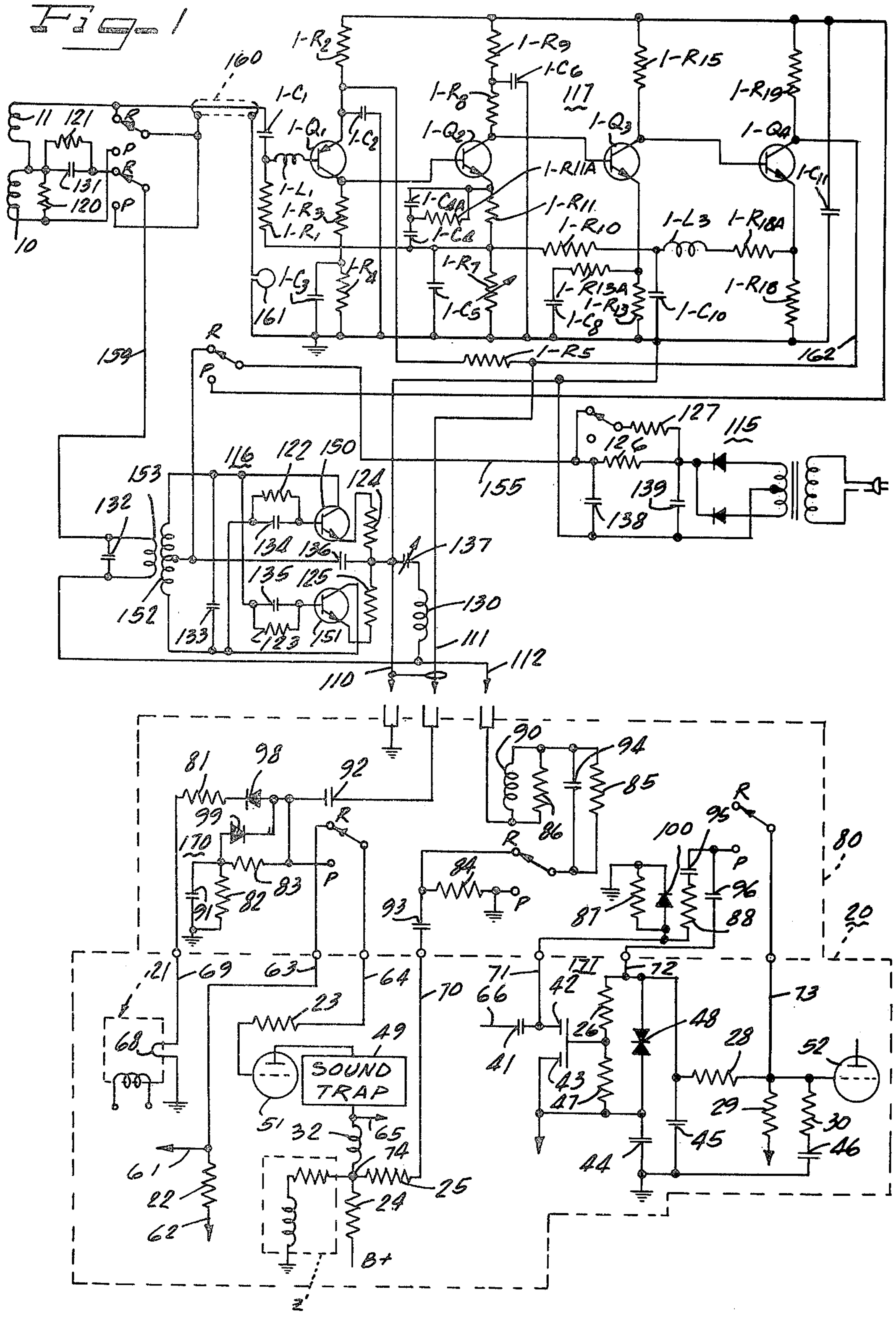

Referring to the drawing there is illustrated recording and playback electric circuitry which is specifically adapted to record and playback monochrome video signals when used in conjunction with a conventional television broadcast receiver.

The various switch contacts are shown in the recording position which they would assume in carrying out a recording operation on a magnetic record tape. The magnetic transducer head assembly is diagrammatically indicated as including a first winding 10 having a relatively large number of turns and a second winding 11 having a lesser number of turns.

In the preferred construction, the magnetic head comprises a ring type core with the first winding 10 encircling a base portion of the core, and the second winding 11 wound on top of the winding 10 and thus being more closely coupled with the signal flux from the record medium at the coupling gap of the magnetic head, and particularly at relatively high signal frequencies where flux in the magnetic core is opposed by eddy currents. Winding 11 is placed such that there is relatively a minimum of leakage in its coupling with the signal flux from the magnetic record medium at the coupling gap, and which leakage is substantially less than that with respect to the winding 10.

In the drawing a broadcast television receiver is indicated by dash line rectangle 20 and includes a horizontal output transformer 21, resistors 22–30, inductor 32, capacitors 41–46, diode pair 48, sound trap 49 and tubes 51 and 52.

As an example, the circuit components may be arranged in a circuit similar to that of the Zenith commercial broadcast television receiver chassis No. 14L30. Having reference to this specific receiver (and referring to certain commercial parts by the use of the manufacturer's notation placed in parenthesis), conductor 61 would be connected to the intermediate frequency second detector component (T4) of the 14L30 chassis and to video peaking circuit parts such as (L5) and (R5), while conductor 62 would lead to parts such as (C33) and (V8) of the sync separator circuitry of the chassis. The normal connection between conductor 61 and the left side of resistor 23 is broken, and conductors 63 and 64 are connected with the now separated circuit points. The tube 51 is identified in the chassis as (V6A) and is a type 6GN8 tube section providing the video frequency amplifier stage of the receiver. The sound trap 49 is identified as component (T5) in said chassis, and circuit point 65 may lead through conventional circuitry to the cathode, for example, of a picture tube (V15) of said chassis identified as type 19CRP4. Conductor 66 in FIG. 1 may be connected with the plate (pin 8) of tube (V8) of the chassis which is a type 6HS8 tube performing the functions of automatic gain control and sync clipping. The tube 52 is identified as (V10A) in said chassis and is formed by one half of a type 6KD8 tube. The horizontal output transformer 21 is shown as being provided with a single turn winding 68 connecting with a conductor 69 such that negative pulses are supplied by 69 during horizontal blanking. The output of the video amplifier tube 51 is supplied to a conductor 70, and connections are made to the horizontal control circuitry 171 associated with tube 52 as indicated by conductors 71, 72 and 73. Preferred values of various components are tabulated below by way of example and not by way of limitation with components which have been added to the commercial receiver circuit and components whose value has been changed suitably indicated.

Table I

| Resistor | Resistance Value (Ohms) |
|---|---|
| 22 | 68,000 |
| 23 | 330 |
| 24* | 7,500 |
| 25* | 3,300 |
| 26 | 330,000 |
| 27 | 330,000 |
| 28 | 1,000,000 |
| 29 | 150,000 |
| 30* | 100,000 |
| Inductor | Inductance Value |
| 32* | 100 microhenries to 316 microhenries |
| Capacitor | Capacitance Value |
| 41* | 100 micromicrofarads |
| 42 | 51 micromicrofarads |
| 43 | 51 micromicrofarads |
| 44** | 390 micromicrofarads |
| 45** | 390 micromicrofarads |
| 46 | 470 micromicrofarads |

*new component added to 14L30 Chassis
value of component changed from that of the 14L30 Chassis With respect to the receiver 20 the conventional chasis No. 14L30 had a resistor (R8) at the location of inductor 32 and had an inductor (L7) at the location of resistor 24. The former components (R8) and (L7) are replaced by the components 32 and 24 in the system The resistor 25 is placed physically near takeoff point 74, from which the video signal is derived for recording, the takeoff point 74 being located between inductor 32 and resistor 24. Thus resistor 25 is physically substantially nearer to circuit point 65 at the output of the video amplifier of the conventional chassis than to the adapter circuitry located in a separate junction box 80 and to which conductor 70 connects. The resistor 25 reduces the loading effect of the record head circuitry connected with conductor 70** on the conventional video circuits, so that a good picture may be observed on the receiver picture tube (V15) while a recording operation is taking place.

The conductors 63, 64 and 69–73 are connected with components of a junction box indicated by the dash line rectangle 80, and the junction box 80 is preferably mounted on the television receiver 20. The junction box 80 contains resistors 81–88, inductor 90, capacitors 91–96 and diodes 98–100.

The preferred values for these components are tabulated below:

Table II

| Resistor | Resistance Value (ohms) |
|---|---|
| 81 | 22,000 |
| 82 | 470,000 |
| 83 | 680,000 |
| 84 | 470,000 |
| 85 | 10,000 |
| 86 | 3,300 |
| 87 | 56,000 |
| 88 | 1,000,000 |
| Inductor | Inductance Value |
| 90 | 100 microhenries |
| Capacitor | Capacitance Value |
| 91 | 0.1 microfarad |
| 92 | .002 microfarad |
| 93 | .47 microfarad |
| 94 | 390 micromicrofarads |
| 95 | 100 micromicrofarads |
| 96 | 200 micromicrofarads |

Diodes 98, 99 and 100 — Type 1N4532

The circuitry of the junction box 80 may be connected with conductors 110–112 by means of a plug and socket connection, the socket member being secured to the junction box 80, and a suitable plug being associated with a cable carrying conductors 110-112. The connections that lead from the TV set components to the junction box 80 preferably terminate in a plug and socket at 69, 63, 64, 70, 71, 72, 73. Thus TV sets may be provided inexpensively with a few connections and a socket; and the junction box added only if used with a recording or playback system. Connections such as 64, 70, etc. may be made to adaptors which fit under the tubes of the TV set. The circuitry at the upper part of the drawing may be disposed closely adjacent to the video tape recorder including the recording head previously referred to having windings 10 and 11. These circuit components may include a direct current power supply component generally designated by the reference numeral 115, a bias frequency oscillator component generally designated by the reference numeral 116, and a playback preamplifier component 117.

The various circuit elements in the upper part of the drawing have been given reference numerals between 120 and 161, or combined letter and number reference characters such as 1-R1 (where the initial number refers to the figure number in which the circuit element is located), and the preferred parameters are summarized below:

Table III

| Resistor | Resistance Value (ohms) |
|---|---|
| 120 | 1,800 |
| 121 | 4,700 |
| 122 | 27,000 |
| 123 | 27,000 |
| 124 | 2.7 |
| 125 | 2.7 |
| 126 | 100 |
| 127 | 10 |
| 1-R1 | 2,200,000 |
| 1-R2 | 120,000 |
| 1-R3 | 2,200 |
| 1-R4 | 18,000 |
| 1-R5 | 1,000,000 |
| 1-R7 | 560 |
| 1-R8 | 470 |
| 1-R9 | 10,000 |
| 1-R10 | 2,700 |
| 1-R11 | 150 |
| 1-R11A | 150 |
| 1-R13 | 120 |
| 1-R13A | 22 |
| 1-R15 | 680 |

Table III-continued

| Resistor | Resistance Value (ohms) | |
|---|---|---|
| 1-R18 | 220 | |
| 1-R18A | 22 | |
| 1-R19 | 470 | |
| Inductor | Inductance Value | |
| 1-L1 | 10 | microhenries |
| 1-L3 | 5.5 | microhenries |
| 130 | 24 | microhenries |
| Capacitor | Capacitance Value | |
| 131 | 300 | micromicrofarads |
| 132 | 100 | micromicrofarads |
| 133 | 820 | micromicrofarads |
| 134 | 50 | micromicrofarads |
| 135 | 50 | micromicrofarads |
| 136 | .05 | microfarad |
| 137 | 8 | micromicrofarads to |
| | 80 | micromicrofarads |
| 138 | 1,000 | microfarads |
| 139 | 1,000 | microfarads |
| 1-C1 | 20 | microfarads |
| 1-C2 | 20 | microfarads |
| 1-C3 | .01 | microfarad |
| 1-C4 | .07 | microfarad |
| 1-C4A | .003 | microfarad |
| 1-C5 | 20 | microfarads |
| 1-C6 | .01 | microfarad |
| 1-C8 | .01 | microfarad |
| 1-C10 | .005 | microfarad |
| 1-C11 | .47 | microfarad |
| Transistor | Type | |
| 1-Q1 | 2N4250 | |
| 1-Q2 | 2N3860 | |
| 1-Q3 | 2N3860 | |
| 1-Q4 | 2N3860 | |
| 150 | 40407 | |
| 151 | 40407 | |
| Diodes 1N463A | | |

Transformer primary 152 – 14 turns No. 18
A.W.G. center tapped, ½ inch diameter by 1 inch long
secondary 153 – 24 turns
No. 30 A.W.G. coupled to primary winding
Hum balancing loop 161 — one inch diameter loop with one or more turns depending on location with respect to hum fields

HEAD PARAMETERS

Winding 10 has 450 turns of No. 48 A.W.G. with an inductance of 4800 microhenries.

Winding 11 has 150 turns of No. 44 A.W.G. with an inductance of 670 microhenries.

The head gap is about 25 microinches long. Connections are series aiding for windings 10 and 11 during playback.

Recording current is about one to two milliamperes peak to peak for the signal, and about 25 to 50 milliamperes bias current peak to peak at 4.7 megacycles per second.

Tape speed is 120, 60, or 30 inches per second.

A tape with an extra smooth surface, either of audio or of instrumentation grade is preferred.

The output of the power supply component 115 at conductor 155 may have a direct current potential of 20 volts. The operating frequency of oscillator 116 may be in the neighborhood of 5 megacycles per second.

During recording, the switch contact arms are in the upper positions as indicated in the drawing and designated by the letter R. During playback, the switch contact arms are in the lower playback position marked by the letter "P". In recording mode, the video signal including the horizontal synchronizing component and the vertical blanking component, that is a conventional composite monochrome signal, may be supplied via conductors 61, 63 and 64 to the grid of tube 51. The output of tube 51 is supplied through resistor 25, conductor 70, conductor 112, secondary 153 (with capacitor 132 in parallel) and conductor 159 to the head winding 11, the upper end of which is grounded through shielding 160 and hum balancing loop 161. The high frequency bias signal is supplied to the primary 152 by oscillator 116 and is superimposed on the video signal at the secondary winding 153.

During playback operation, with the switch contacts in the lower position, head windings 10 and 11 are connected in series aiding relation to the input of the preamplifier 117. With a series aiding connection, the low frequency components of the recorded signal produce voltages in windings 10 and 11 which are additive with respect to the input of preamplifier 117. The output of the amplifier 117 is supplied via conductor 162 and conductor 111 to the grid circuit of tube 51 for amplification and display on a conventional television receiver display tube.

The resistor 120 is connected across head winding 10 to suppress undesirable ringing or resonance peaks which may occur in the head circuit, and to reduce internal impedance of the head circuit.

Connected with conductor 64 during playback operation is a clamping network 170 including diodes 98, 99 and resistor 81 which are connected to winding 68 on the horizontal output transformer 21.

The horizontal stabilizing circuitry 171 at the input of the tube 52 receives the reproduced horizontal sync component from the magnetic record medium so as to control the sweep rate of the horizontal sweep signal for the deflection system of the televison receiver cathode ray tube. Horizontal synchronizing pulses from a sync pulse separator of the television receiver are applied to line 66.

The direct coupled amplifier circuit of is highly stable because of the direct current feedback path from the output stage 1-Q4 through 1-R18A, 1-L3 and 1-R10 to the second stage 1-Q2, and from the second stage through 1-R1 to the input of stage 1-Q1, and also from the collector of 1-Q4 through 1-R5 to the emitter of 1-Q1. The negative feedback circuitry is also effective at relatively low frequencies (below 1000 cycles per second) to progressively reduce the response of the amplifier as a function of input frequency as frequency is decreased, reducing hum and fluctuations that would otherwise be annoying. The use of the NPN type transistor 1-Q1 for the first stage and the PNP type transistor for the following stage 1-Q2 improves the biasing condition by providing a low direct current voltage of only about 1.6 volts at the base of the second stage 1-Q2.

The first stage 1-Q1 operates at low collector current and voltage to give a high input impedance and low noise level. The input impedance may be adjusted for optimum loading of the head circuit by varying 1-R2. A reduction in the value of 1-R2 decreases the input impedance of the amplifier stage 1-Q1. The stage 1-Q1 has a response which rises as frequency decreases from approximately 8 kilocycles per second to approximately 1 kilocycle per second, and a substantially level response at high frequencies. This is desirable because the head output voltage is extremely low at low frequencies, while an attempt to boost the high frequencies at the first stage 1-Q1 would increase the input capacitance lower the resonant frequency of the head circuit. The circuit constants for the first stage 1-Q1 and tabulated in Table III, supra give optimum operation with an equivalent source resistance of the order of about 2000 ohms, which is optimum for the head used at the highest frequencies in the useful range. For example, the input stage 1-Q1 is matched to an equivalent head resistance of about 2000 ohms (measured at frequencies above about 100 kilocycles per second) so as to give minimum noise. Thus, if the noise-figure of the first stage is measured as a function of resistance values connected across the input to the first stage, the minimum noise-figure will be observed for an input resistance of the order of 2000 ohms. By utilizing a head providing an equivalent source resistance of the order of 2000 ohms, optimum operation may be realized. In this sense, the input stage of the video amplifier 117 is matched for minimum noise to the effective source resistance of the playback head.

The second stage 1-Q2 has a rising response as frequency is decreased at frequencies between about 35 kilocycles per second and 1.5 kilocycles per second and which response as a function of frequency overlaps the rising response region exhibited by the first stage 1-Q1. Also the middle high frequencies, for example in the region of 15 kilocycles per second, are boosted by the network in the emitter of 1-Q2 including 1-C4, and the highest frequencies are boosted by capacitor 1-C4A.

The third stage 1-Q3 has a rising response as a function of input frequency as frequency is increased at the high frequency end of the amplifier range due to capacitor 1-C8 and resistor 1-R13A. For example, this third stage provides a rising response at frequencies between about 100 kilocycles per second and 2 megacycles per second or above.

The fourth stage 1-Q4 has a steep rise as frequency is increased at the high frequency end of the spectrum due to the resonance network 1-C10, 1-L3, 1-R18A; followed by a drop (due to 1-L3) in the response at frequencies above the useful range of the recording system. This steep rise is useful in compensating for the rapid drop in the output from the magnetic playback head at the highest frequencies. The fall off above this range in response as a function of frequency makes the amplifier more stable against oscillations and parasitics, and reduces the amplifier noise.

The amplifier 117 has been described in terms of bi-polar transistors, but vacuum tubes may be substituted, the plate of a vacuum tube being analogous to the collector of a transistor, the grid analogous to the base, and the cathode analogous to the emitter. Similarly for field effect transistors where the drain, gate and source are analogous to the collector, base and emitter, respectively.

In the drawing the successive amplifier stages 1-Q1 through 1-Q4 are direct coupled, the first stage comprising a PNP transistor 1-Q1 directly coupled from its collector to the base input of the NPN transistor 1-Q2. The first stage 1-Q1 has its collector operating at a voltage of the order of 1.6 volts. Thus there is a direct current coupling path between the collector of 1-Q1 and the base 1-Q2, between the collector of 1-Q2 and the base of 1-Q3 and between the collector of 1-Q3 and the base of 1-Q4.

The inductance 1-L1 of low distributed capacitance is incorporated directly at the base of 1-Q1. This acts in conjunction with the relatively higher base capacitance to prevent pickup and rectification of radio frequency fields which are otherwise troublesome in this type of amplifier. The inductance 1-L1 and associated input wiring is sensitive to low frequency magnetic fields, for example motor hum. This is counteracted by a balancing loop such as shown at 161 located close to 1-L1, adjusted to balance out the low frequency pickup. Alternatively 1-L1 may be of two sections in hum bucking relation, or may be toroidally wound.

I claim as my invention:

1. In combination with a television display device for display of televison signals, a transducer head for reproducing recorded television signals for displays by means of said television display device, and a coupling circuit connected with said transducer head and with said television display device for supplying reproduced television signals to said television display device for display thereby, the improvement characterized in that said coupling circuit comprises a video playback amplifier having an input with a shunt capacitance shunting said input, and an inductor connected in series between said transducer head and said input of said amplifier, said inductor being disposed closely adjacent to the amplifier input and having a distributed capacitance of a relatively low capacitance value in comparison to said shunt capacitance to prevent pickup and rectification of radio frequency fields by said video playback amplifier, and means comprising said inductor for counteracting the effect of hum frequency magnetic fields in the vicinity of said inductor so as to substantially reduce transmission of hum frequency induced voltages from said inductor to said video playback amplifier.

* * * * *